Aug. 2, 1932.   J. D. SAMPLE   1,869,915
PIPE JOINT
Filed Sept. 27, 1928
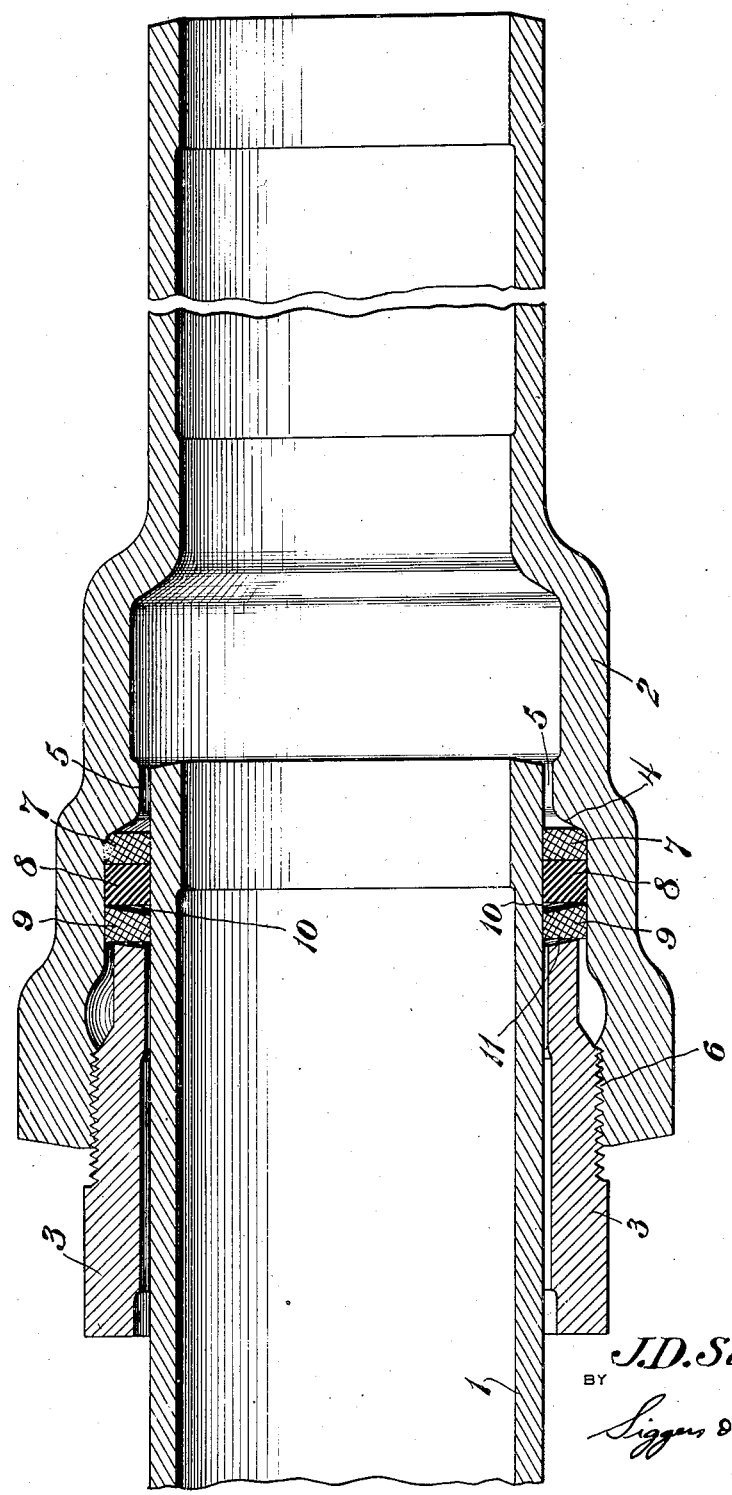
INVENTOR
J.D. Sample,
BY
Siggers & Adams
ATTORNEYS Patented Aug. 2, 1932

1,869,915

UNITED STATES PATENT OFFICE

JAMES D. SAMPLE, OF BIRMINGHAM, ALABAMA, ASSIGNOR TO McWANE CAST IRON PIPE COMPANY, OF BIRMINGHAM, ALABAMA, A CORPORATION OF ALABAMA

PIPE JOINT

Application filed September 27, 1928. Serial No. 308,632.

This invention relates to pipe joints, and among other objects, aims to provide a very serviceable pipe joint which will hold illuminating or other gas, without leakage, which may be installed in the field, and which will allow expansion and contraction without leakage, and will have the necessary flexibility.

Referring to the accompanying drawing forming a part of this specification, there is shown, in the single figure, a longitudinal diametric section of a pipe joint embodying the invention.

In the drawing, the pipe shown is of the bell and spigot type; and the improved pipe joint is made by inserting the spigot 1 into the bell 2 which has packing material therein, and then screwing down a gland 3 which compresses the packing.

The bell 2 has a shoulder 4 formed interiorly thereof, the smallest interior diameter of the shoulder being greater than the exterior diameter of the spigot so that there is a small annular space 5 between the spigot and bell whenever the spigot is centered in the bell, permitting slight relative movement of the pipe sections due to sagging. At the outer end, the bell is provided with interior screw-threads 6 and the gland 3 has exterior threads for engagement therewith.

The packing consists of three separate rings, a lead ring 7 which is shown as more or less square in cross-section, although it may be angular in section, a rubber ring 8 of similar section and another lead ring 9 outside of the rubber ring. Preferably the rubber ring 8 is somewhat thicker than either of the lead rings. The lead ring 7 is abutted against shoulder 4 and is of such interior and exterior diameters that it fits against the spigot and bell. Obviously, the lead ring 7 may be calked very tightly in position, if desired, with the aid of a calking tool (not shown), before the other two rings are pushed into the joint.

The lead ring 9 is of less thickness adjacent the spigot than at its periphery where it is in contact with the interior of the bell. As the rubber ring 8 has the face which is opposed to ring 9 more or less plane, the result is that an annular space 10 is left between the rings 8 and 9, as shown. The gland 3 is of reduced thickness where it enters the bell and has an inwardly beveled inner end 11 which is designed to contact with ring 9 and force the same tight against the rubber ring 8, thus closing space 10. The lead and rubber rings 7, 8 and 9, particularly rings 8 and 9, tend to spread radially due to the reaction of the pressure from the end 11 of the gland; and this spreading forces both the lead and the rubber rings so strongly into the rough surfaces of the pipe sections that the joint is made absolutely gas-tight. The rubber ring is reduced in thickness by the pressure from the screw gland through ring 9, and after being thus compressed, tends to force the inner lead ring 7 out through the narrow annular space 5. Thus the compressive stresses due to tightening the gland force the three rings so tightly together that they form substantially a single packing, which will hold water or gas under pressure, without leakage. Pressure of the gland is exerted uniformly upon the packing and hence compression of the packing takes place uniformly throughout its mass. The packing so formed completely fills the space in the bell between shoulder 4 and the inner end of the gland, and may spread somewhat beyond the shoulder, on the inside, and around the end of the gland. The rubber ring 8 is hermetically sealed by the two lead rings 7 and 9 when compressed, and hence deterioration due to slow oxidation and other causes is obviated for an indefinite period.

As shown, the gland is larger than the spigot so that it need not be in contact therewith at any point. Preferably the gland is counterbored, or has offsets cast therein, as shown at 12, to permit the slight angular movement of the spigot previously referred to. As the drawing shows, the spigot is supported entirely by the highly compressed packing, and hence it may move longitudinally under expansion and contraction without affecting the tightness of the joint and without subjecting the pipe to destructive strains.

The above description is of the preferred form. Instead of the inner lead ring 7, a braided jute packing may be used. If the joint is to hold water only, jute, either loose or braided, treated or untreated, may be used instead of the rubber ring. When working with gas, however, the described packing of two lead rings with an intermediate rubber ring has been found to be highly satisfactory, as it holds the gas even under high pressure.

For simplicity, only a bell and spigot joint is illustrated. It will be obvious that the bell shown may be a part of a short pipe coupling having threads at the end opposite from the bell to take standard pipe fittings, or having another bell to form a double hub threaded expansion joint, or having a flange to form a hub and flange threaded adapter. In all forms, the same spigot, bell, packing and gland are used, as shown in the drawing. Hence it is not believed to be necessary or desirable to amplify the drawing to show constructions already known in the art.

Obviously the present invention is not restricted to the particular embodiment thereof herein shown and described.

What I claim is:

A pipe joint comprising, in combination, a bell having an annular shoulder on its interior; a pipe section whose outside diameter is less than the least diameter of the shoulder, and received in the bell so as to be spaced from said shoulder and having its end extending beyond the shoulder and having a plain, smooth exterior surface; packing material between the pipe section and the bell and abutted against said shoulder; a gland screw threaded to the bell at the mouth thereof and engaging the packing material with its inner end, but being out of contact with the pipe section when the pipe is centered in the bell; said gland compressing the packing material and forcing it radially in both directions to make a tight joint; said packing material comprising an inner ring of soft metal abutted against the shoulder and fitting closely within the bell and upon the pipe section, a rubber ring adjacent the inner ring, and an outer soft metal ring with which the gland contacts; the outer ring fitting closely over the pipe section and being of reduced thickness adjacent the pipe section; the end of the gland being beveled so as to force the outer ring against the pipe section when screwed down tightly.

In testimony that I claim the foregoing as my own, I have hereto affixed my signature.

JAMES D. SAMPLE.